Dec. 9, 1958  E. F. ELMS  2,863,195
FASTENER
Filed Dec. 22, 1955
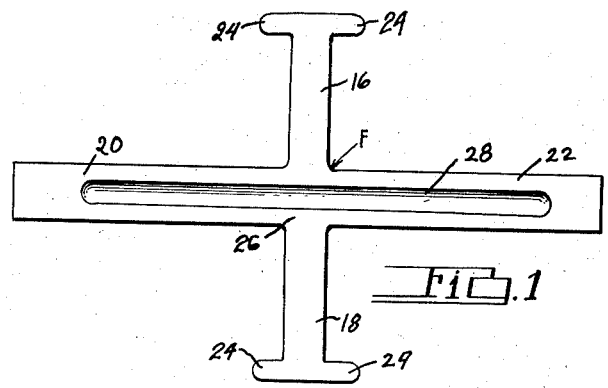
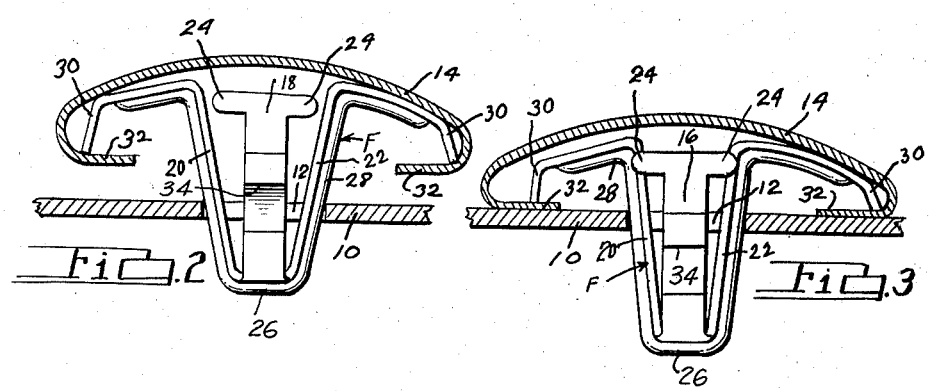
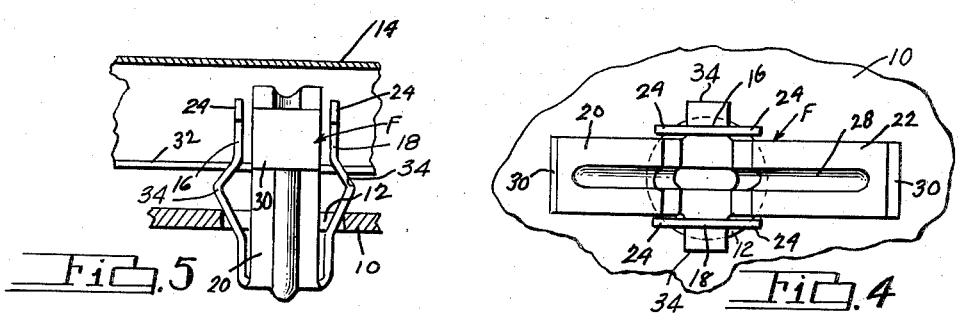
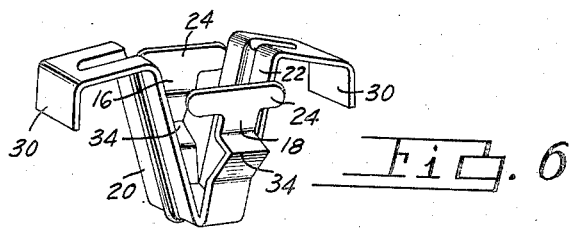
INVENTOR.
EDWIN F. ELMS
BY
ATTORNEY United States Patent Office 2,863,195
Patented Dec. 9, 1958

2,863,195
FASTENER

Edwin F. Elms, Roseville, Mich., assignor to Robert L. Brown, Ferndale, Mich.

Application December 22, 1955, Serial No. 554,776

2 Claims. (Cl. 24—73)

This invention relates to a fastener of the type adapted to be secured to a supporting panel to which is applied a decorative or associated attachment. The invention has been illustrated as a means for securing ornamental beading or so called trim molding to a support. It will be apparent, however, that the principles of the invention are readily applicable to other uses.

An object of the invention is to provide an improved securing fastener of the indicated character which may be quickly and easily attached and which provides a secure fastener.

Another object of the invention is to provide such a fastener having resilient portions which may be readily inserted through an aperture in a supporting part or panel and finally secured to the support by the resilient movement of portions of the fastener into the path of other portions of the fastener to retain the securing means for the fastener in tight holding engagement with the support.

Other objects and advantages of such a fastener will be more apparent from the following description taken in connection with the accompanying drawings, in which:

Fig. 1 is a top plan view of a sheet metal blank from which the improved fastener is formed;

Fig. 2 is a side elevational view of the fastener after it has been formed and ready for insertion into the aperture in the support, the trim molding and supporting panel being shown in cross section;

Fig. 3 is a cross sectional view corresponding to Fig. 2 showing the fastener after it has been applied to the parts in final assembly;

Fig. 4 is a top plan view of Fig. 3, with the trim molding removed;

Fig. 5 is an end elevational view of Fig. 2, the trim molding and supporting panel being shown in cross section; and Fig. 6 is a perspective view of the finished fastener before it is applied to a panel.

Referring now to the drawings, the reference numeral 10 designates a supporting panel provided with an aperture 12 therethrough for receiving the fastener which secures a molding 14 to the outer face of the panel.

The fastener designated by the letter F is formed from flat spring steel material and is blanked out to the form shown in Fig. 1. The blank is then formed to the shape shown in Fig. 2. The blank is of general cross shape having four legs 16, 18, 20 and 22. The opposite legs 16 and 18 are in a straight line and the opposite legs 20 and 22 are in a straight line and at right angles to the legs 16 and 18. The legs 16 and 18 are provided with outwardly extending projections 24 on their opposite sides and located at the outer free ends thereof. Between the projections 24 and the legs 20 and 22, the legs 18 and 16 are depressed downwardly into V shaped portions 34, the apex of the V being formed outwardly of the plane of the leg portions. The legs 20 and 22 and the connecting portion 26 for all four legs are provided with a depressed U shaped rib 28 for stiffening purposes. The outer end portions of the legs 20 and 22 are bent downwardly substantially at right angles to the plane of the connecting portion 26 of the legs, which are hereinafter referred to as the hold-down flanges 30.

The legs 16, 18, 20 and 22, of the blank thus formed, are bent to closely approach, but not entirely, right angle bends with plane of the connecting portion 26 at the intersection of the connecting portion and the legs, presenting a fastener of the shape and form shown in Fig. 2.

The molding 14 is provided with inturned flanges 32 which are held to the panel 10 by the hold-down flanges 30. The fastener may be first applied to the molding 14 by springing the legs 20 and 22 inwardly so that the hold-down flanges enter between the flanges 32, after which they are spring urged to a position over the flanges 32. The fastener is retained in the molding by frictional engagement caused by the resiliency of the legs. The fastener may be applied to the panel 10 and the molding 14 applied to the fastener after it is in locked position, by sliding the inturned flanges 32 under the hold-down flanges 30.

When the fastener is applied to the panel, the four legs 16, 18, 20 and 22, and the connecting portion 26 are inserted in the aperture 12 of the panel. This is done without resistance until the lower outwardly tapered sides of the V 34 depression strike the edge of the aperture in the panel. This causes increasing resistance to further insertion of the fastener up to the apex of the V 34; the legs 16 and 18 springing inwardly to permit such insertion. When the apex of the V 34 passes the lower edge of the aperture the legs are sprung outwardly and the upper outwardly tapered sides of the V 34 urge the fastener downwardly through the aperture. The aperture is of such size to receive the lower end of the legs without resistance or application of force on the legs 20 and 22, but just as soon as the apex of the V 34 has passed through the aperture the legs are urged to be forced inwardly by the edge of the aperture, and further downward movement of the fastener, causes the legs 16 and 18 to be sprung inwardly, due to the V 34, with the flanges 24 between the legs 20 and 22. After the apex of the V 34 has passed the edge of the aperture, the legs 16 and 18 are moved outwardly permitting the legs 20 and 22 to move inwardly between the flanges 24 and when the fastener is in its final assembled position, the flanges 24 are prevented from inward movement by the engagement of the flanges 24 on the side edges of the legs 20 and 22 and the fastener is securely locked in the panel by the upper surfaces of the V 34 urging the fastener downwardly in the panel.

While it will be apparent that the preferred embodiments of the invention herein disclosed are well calculated to fulfill the objects above stated, it will be apparent that the invention is susceptible of modifications, variations and change without departing from the proper scope of fair meaning of the appended claims.

I claim:

1. A spring steel metal fastener for reception in a supporting panel comprising, a four sided connecting portion, legs arranged at each of the sides of said connecting portion, said legs extending upwardly from said connecting portion, one pair of oppositely disposed legs having outwardly extending V shaped projections formed intermediate their length, outwardly extending flanges in the plane of said legs and at the outer free ends of said legs, the other pair of oppositely disposed legs having outwardly extending molding engaging portions of a width to be received between said first pair of legs when the side faces on opposite sides of said V are in engagement with the side edges of the aperture in the supporting panel, but greater in width than the distance between said flanges at the free ends of said first named legs when the apexes of said V are in engagement with the side edges of the aperture in the supporting panel.

2. A spring steel metal fastener for reception in an aperture in a supporting panel comprising, a four sided connecting portion, legs arranged at each of the sides of said connecting portion, said legs extending upwardly from said connecting portion and at outwardly divergent angles with each other, one pair of oppositely disposed legs having outwardly pressed V shaped projections formed intermediate their length, the other pair of oppositely disposed legs having outwardly and downwardly extending molding engaging portions, said legs being resiliently deflectable inwardly toward each other when the fastener is inserted in the aperture in the supporting panel, said last named pair of legs having a width to be received between said first named pair of legs after the apex of the V has passed through the aperture in the supporting panel, but greater in width than the distance between said first named legs when the apex of the V is within the aperture, said first named pair of legs having a width at their free ends greater than the distance between said last named pair of legs when the fastener is applied to the panel ends.

References Cited in the file of this patent

UNITED STATES PATENTS

| | | |
|---|---|---|
| 2,300,478 | Wiley | Nov. 3, 1942 |
| 2,631,345 | Poupitch | Mar. 17, 1953 |
| 2,698,979 | Flora | Jan. 11, 1955 |